United States Patent
Gray

(10) Patent No.: US 11,153,267 B2
(45) Date of Patent: Oct. 19, 2021

(54) USING DYNAMIC HOST CONTROL PROTOCOL (DHCP) AND A SPECIAL FILE FORMAT TO CONVEY QUALITY OF SERVICE (QOS) AND SERVICE INFORMATION TO CUSTOMER EQUIPMENT

(71) Applicant: Charter Communications Operating, LLC, St. Louis, MO (US)

(72) Inventor: Willard Andrew Gray, Castle Rock, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 27 days.

(21) Appl. No.: 16/130,998

(22) Filed: Sep. 13, 2018

(65) Prior Publication Data
US 2020/0092253 A1  Mar. 19, 2020

(51) Int. Cl.
*H04L 29/12* (2006.01)
*H04L 29/08* (2006.01)
*H04L 12/24* (2006.01)

(52) U.S. Cl.
CPC ...... *H04L 61/2015* (2013.01); *H04L 41/0806* (2013.01); *H04L 41/5003* (2013.01); *H04L 67/02* (2013.01)

(58) Field of Classification Search
CPC ............. H04L 61/2015; H04L 41/0806; H04L 41/5003; H04L 67/02; H04L 41/5003
See application file for complete search history.

(56) References Cited

U.S. PATENT DOCUMENTS

| | | | |
|---|---|---|---|
| 7,107,326 B1 * | 9/2006 | Fijolek | H04L 61/2015 709/220 |
| 7,792,963 B2 | 9/2010 | Gould | |
| 2002/0044567 A1 * | 4/2002 | Voit | H04L 47/2408 370/467 |
| 2003/0056217 A1 | 3/2003 | Brooks | |
| 2006/0130107 A1 | 6/2006 | Gonder et al. | |
| 2007/0217436 A1 | 9/2007 | Markley | |
| 2009/0198804 A1 * | 8/2009 | Danforth | H04L 63/10 709/221 |
| 2009/0248794 A1 | 10/2009 | Helms | |
| 2009/0292794 A1 * | 11/2009 | Ding | H04L 12/2834 709/221 |

(Continued)

OTHER PUBLICATIONS

TR-069, CPE WAN Management Protocol, The Broadband Forum, March (Year: 2018).*

(Continued)

*Primary Examiner* — Philip C Lee
(74) *Attorney, Agent, or Firm* — Otterstedt, Wallace & Kammer, LLP

(57) ABSTRACT

A request is received from customer premises equipment of a customer; the request is responded to with a pointer to a configuration file containing circuit configuration information for the customer. The configuration file is generated. Responsive to the customer premises equipment of the customer following the pointer, the configuration file is served out to the customer premises equipment of the customer. Subsequent internet traffic from the customer is treated in accordance with the configuration file.

25 Claims, 16 Drawing Sheets

(56) References Cited

U.S. PATENT DOCUMENTS

| | | | |
|---|---|---|---|
| 2010/0313236 A1 | 12/2010 | Straub | |
| 2014/0108649 A1* | 4/2014 | Barton | G06F 9/4445 709/224 |
| 2015/0100673 A1* | 4/2015 | Asati | H04L 12/4641 709/221 |
| 2015/0229561 A1* | 8/2015 | Bastian | H04L 45/306 370/392 |

OTHER PUBLICATIONS

B. Desruisseaux, Ed., Request for Comments: 5545, Internet Calendaring and Scheduling Core Object Specification (iCalendar), Network Working Group, Sep. 2009, pp. 1-169.

Wikipedia, Dynamic Host Configuration Protocol, downloaded Sep. 14, 2018 from https://en.wikipedia.org/wiki/Dynamic_Host_Configuration_Protocol, pp. 1-26, p. last edited Sep. 6, 2018.

Wikipedia, Quality of service, downloaded Sep. 14, 2018 from https://en.wikipedia.org/wiki/Quality_of service, pp. 1-8, p. last edited Aug. 28, 2018.

Wikipedia, JSON, downloaded Sep. 14, 2018 from https://en.wikipedia.org/wiki/JSON, pp. 1-16, p. was last edited on Sep. 13, 2018.

* cited by examiner

```
Code   Len   URL
+-----+-----+-----+-----+-----+-----+--
| TBD |  n  | d1  | d2  | d3  | d4  | ...
+-----+-----+-----+-----+-----+-----+--
```

*FIG. 13*

| | |
|---|---|
| `{`<br>  `"service": {`<br>    `"default": {`<br>      `"type": "default",`<br>      `"policy": "PS-default"`<br>    `},`<br>    `"S-quiethours": {`<br>      `"type": "tod",`<br>      `"tod": {`<br>        `"recurrence": "FREQ=DAILY",`<br>        `"start": "20180101T030000Z",`<br>        `"duration": "P3H"`<br>      `},`<br>      `"policy": "PS-quiethours"`<br>    `},`<br>    `"S-exceeds": {`<br>      `"type": "bandwidth",`<br>      `"bandwidth": {`<br>        `"countfrom": "20180101T000000Z",`<br>        `"interval": "P1M",`<br>        `"startlimit": 100000000`<br>      `},`<br>      `"policy": "exceeds"`<br>    `}`<br>  `},` | Default service 1401<br><br><br>Quiet Hours Service takes effect 3-6am every day 1403<br><br><br><br>"S-exceed" service takes effect after monthly bandwidth calendar (that starts, e.g., on the 1st of every month) exceeds 100GB 1405 |
|   `"policy-sets": {`<br>    `"PS-default": [` ← 1409<br>      `"P-exempt",`<br>      `"default"`<br>    `],`<br>    `"PS-exceeds": [` ← 1411<br>      `"P-exempt",`<br>      `"P-exceeds"`<br>    `],`<br>    `"PS-quiethors": [`<br>      `"P-quiethours"` ← 1413<br>    `]`<br>  `},` | Special policy for exempted traffic to the billing and support site, re-used in policy-sets other than "quiet hours" 1407 |

*FIG. 14A*

```
"policies": {
    "P-exempt": {
      "match": {
        "dst-prefixes-v4": [
          "192.168.50.0/24"
        ]
      },
      "action": {
        "type": "forward",
        "no-bandwidth": true,
        "forward": {
          "rate": 35000000   ← 1417
        }
      }
    },
    "P-exceeds": {
      "action": {
        "type": "forward",
        "forward": {
          "rate": 350000000,
          "cost": {
1421         "currency": "USD",
     ↘       "unit-cost": "5.00",
             "unit-bytes": 5000000
          }
        }
      }
    },
    "P-quiethours": {
      "action": {
        "type": "forward",
        "forward": {            1425
          "rate": 45000000   ←
        },
        "no-bandwidth": true
      }
    },
    "default": {
      "action": {
        "type": "forward",
        "forward": {
          "rate": 35000000
        }
      }
    }
  }
}
```

Define exempt policy, with the required prefix and the "no-bandwidth" flag 1415

"Exceeds" policy continues to forward at 35Mb/s, but bills $5 per 5GB 1419

"Quiet Hours": no billing, does not count towards bandwidth usage, increased speed. A "very smart" device may opt to do upgrades, download ISOs or BitTorrent, or do backups at this time 1423

Define default policy as forwarding at 35Mb/s 1427

*FIG. 14B*

```
{
  "service": {
    "default": {
      "type": "default",
      "policy": "PS-default"
    }
  },
  "policy-sets": {
    "PS-default": [
      "gold",
      "silver",                    ← 1501
      "default"
    ]
  },
  "policies": {
    "gold": {
      "match": {
        "traffic-class": "gold"
      },
      "action": {
        "type": "forward",
        "forward": {               ← 1503
          "rate": 100000000,
          "mark": {
            "dscp": 32,
            "8021p": 4
          }
        }
      }
    },
    "silver": {
      "match": {
        "traffic-class": "silver"
      },
      "action": {
        "type": "forward",
        "forward": {               ← 1505
          "rate": 200000000,
          "mark": {
            "dscp": 16,
            "8021p": 2
          }
        }
      }
    },
    "default": {
      "action": {
        "type": "forward",
        "forward": {
```

*FIG. 15A*

```
"rate": 700000000,
"mark": {
  "dscp": 0,
  "8021p": 0
    }
   }
  }
 }
}
```
← 1507

*FIG. 15B*

USING DYNAMIC HOST CONTROL PROTOCOL (DHCP) AND A SPECIAL FILE FORMAT TO CONVEY QUALITY OF SERVICE (QOS) AND SERVICE INFORMATION TO CUSTOMER EQUIPMENT

FIELD OF THE INVENTION

The present invention relates generally to the electrical, electronic, and computer arts, and more particularly relates to provisioning in computer networks and the like.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and may be referred to at some points herein in capital letters, without the® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Provisioning, within a broadband network, includes the process of ensuring that customer premises equipment (CPE) such as cable modems, digital subscriber line (DSL) modems, and the like are properly configured, authenticated, and successfully come online. Currently, in residential systems, customers typically manually configure equipment, often without any standard format or document from the service provider. Similar issues may arise in a commercial context; the customer may sign a written contract containing the technical information; and provide it to a network engineer who manually programs the router or other equipment with the correct settings, flags, etc. These processes are known from historical experience to be error-prone.

SUMMARY OF THE INVENTION

Techniques are provided for using dynamic host control protocol (DHCP) and a special file format to convey quality of service (QoS) and service information to customer equipment.

In one aspect, an exemplary method includes receiving a request from customer premises equipment of a customer; responding to the request with a pointer to a configuration file containing circuit configuration information for the customer; generating the configuration file; responsive to the customer premises equipment of the customer following the pointer, serving the configuration file out to the customer premises equipment of the customer; and treating subsequent internet traffic from the customer in accordance with the configuration file.

In another aspect, another exemplary method includes obtaining, at customer premises equipment of a customer, from an internet service provider (ISP), a configuration file containing circuit configuration information for the customer; configuring the customer premises equipment of the customer in accordance with the configuration file; and the configured customer premises equipment of the customer routing traffic in accordance with the configuring step.

In still another aspect, an exemplary customer premises equipment (CPE) device includes a memory; at least one processor coupled to the memory; and a non-transitory persistent storage medium that contains instructions which, when loaded into the memory, configure the at least one processor to: obtain, from an internet service provider (ISP), a configuration file containing circuit configuration information for a customer corresponding to the customer premises equipment (CPE) device; configure the customer premises equipment (CPE) device in accordance with the configuration file; and route traffic in accordance with the configuring.

In still another aspect, an exemplary system includes a dynamic host control protocol (DHCP) server of an internet services provider (ISP); a router of the internet services provider (ISP); a back-end provisioning database of the internet services provider (ISP); a quality of service (QoS) configuration file generator coupled to the back-end provisioning database; and a web server of the internet services provider (ISP), coupled to the quality of service (QoS) configuration file generator the dynamic host control protocol (DHCP) server receives a dynamic host control protocol (DHCP) request from customer premises equipment of a customer of the internet services provider (ISP); the dynamic host control protocol (DHCP) server responds to the request with a pointer to a configuration file containing circuit configuration information for the customer; and the quality of service (QoS) configuration file generator coupled to the back-end provisioning database generates the configuration file. Responsive to the piece of customer premises equipment of the customer following the pointer, the web server serves the configuration file out to the customer premises equipment of the customer; and the router of the internet services provider (ISP) switches subsequent data packets from the customer in accordance with indicators placed in the packets by the customer premises equipment of the customer in accordance with the configuration file.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., customer premises equipment, router, server, or the like) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide accurate synchronization of the provisioning between the service provider (e.g. Internet Service Provider or ISP) and the customer, which improves the customer experience and reduces trouble calls and confusion between the customer and the provider.

These and other features and advantages of the present invention will become apparent from the following detailed description of illustrative embodiments thereof, which is to be read in connection with the accompanying drawings.

BRIEF DESCRIPTION OF THE DRAWINGS

FIG. 13 shows an exemplary pointer to a quality of service (QoS) definition file, according to an aspect of the invention;

FIGS. 14A and 14B show an example policy file for a residential cable modem, according to an aspect of the invention; and FIGS. 15A and 15B show an example policy file for a commercial customer, according to an aspect of the invention.

DETAILED DESCRIPTION OF PREFERRED EMBODIMENTS

Figure 1:
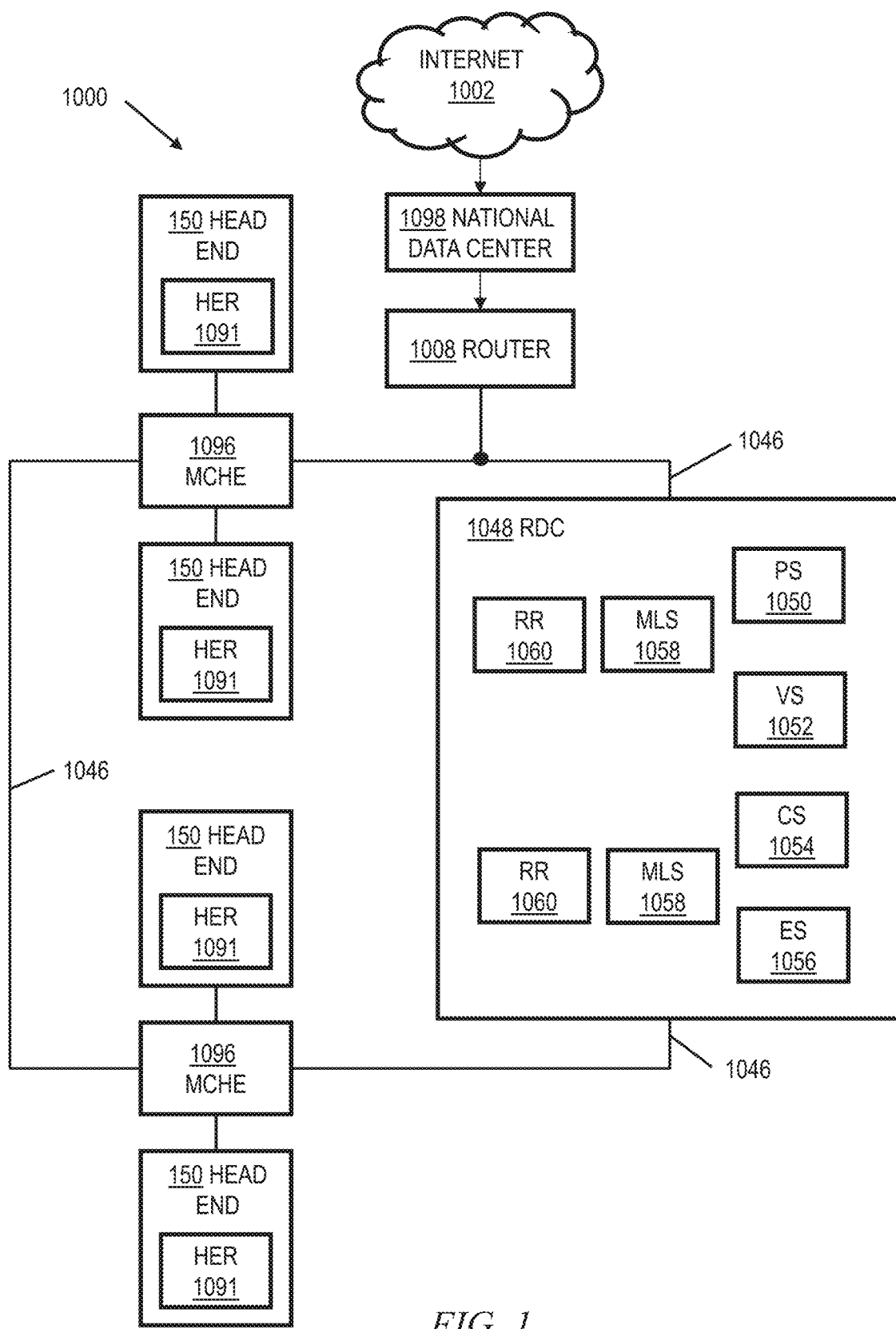
FIG. 1 is a block diagram of an exemplary embodiment of a system, within which one or more aspects of the invention can be implemented.

As noted, IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
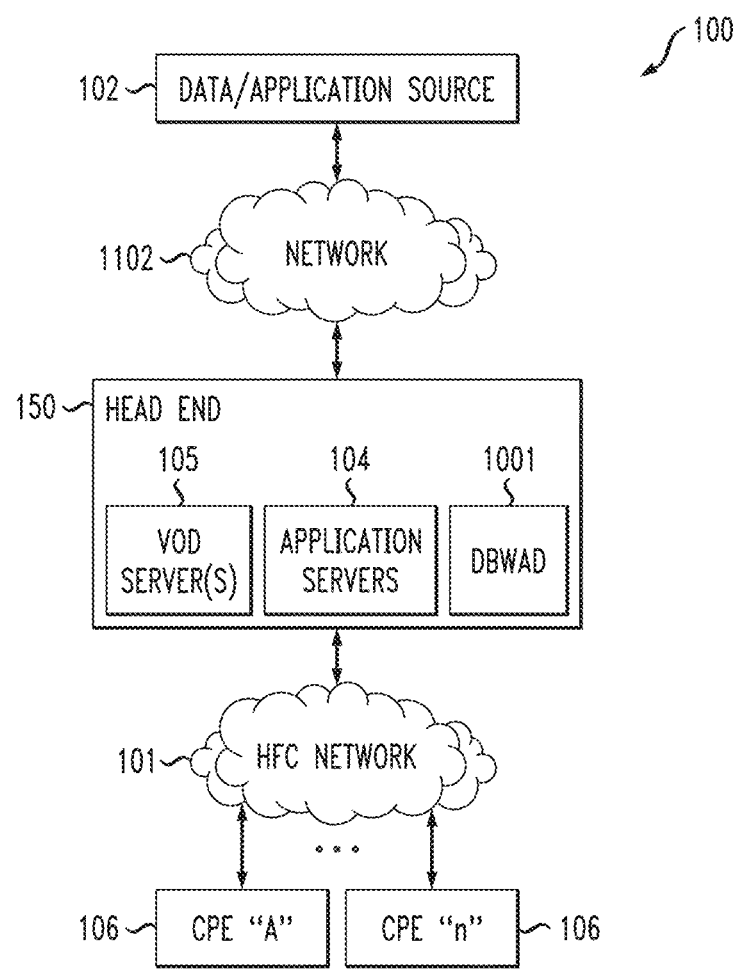
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
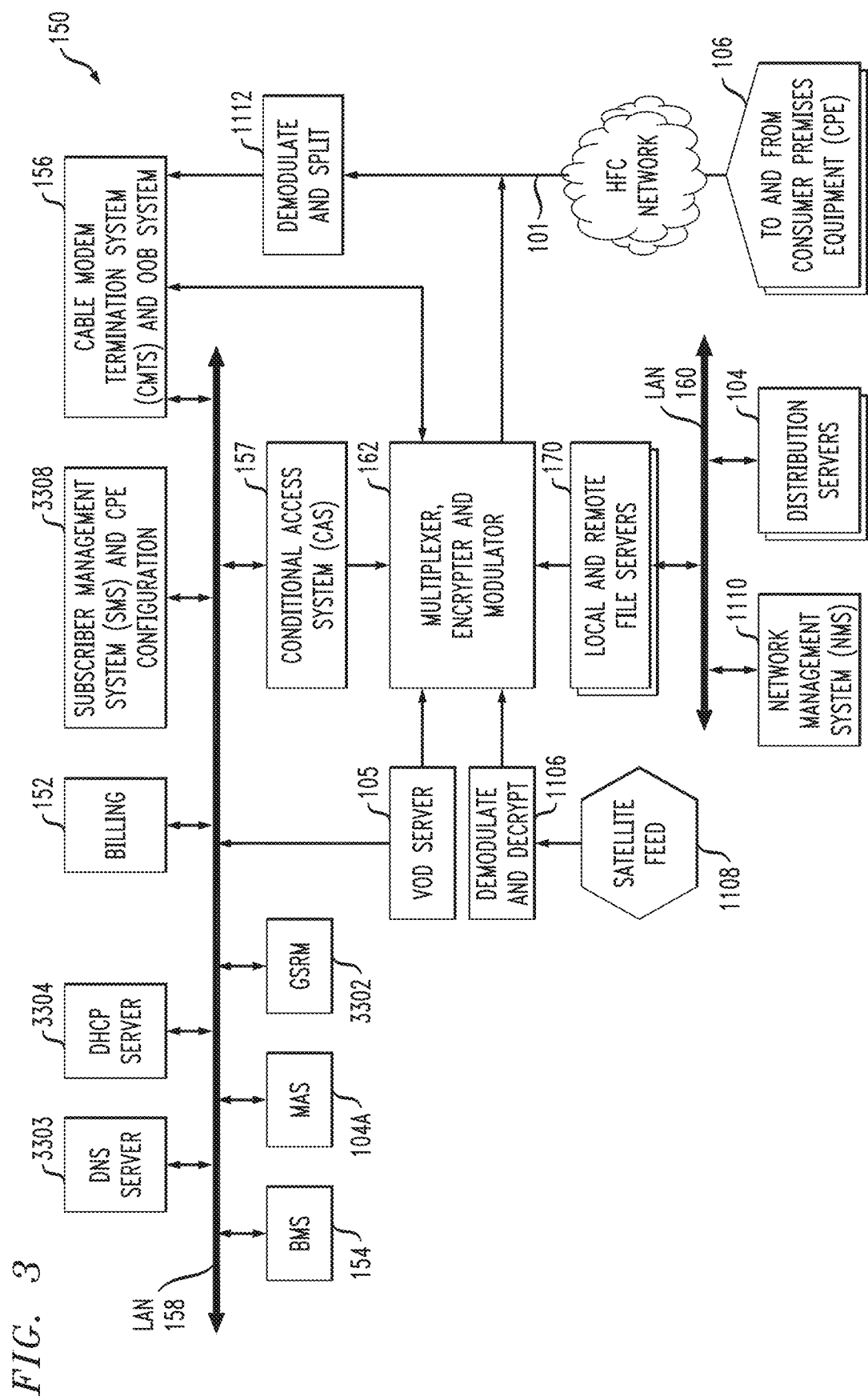
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0, 3.0, or 3.1). The OpenCable™ Application Platform (OCAP) 1.0, 1.3.1, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server is optional; it could be located in the head-end as shown at 3303, but it can also be located in a variety of other places if present. One or more Dynamic Host Configuration Protocol (DHCP) server(s) 3304 can also be located where shown or in different locations.

Figure 4:
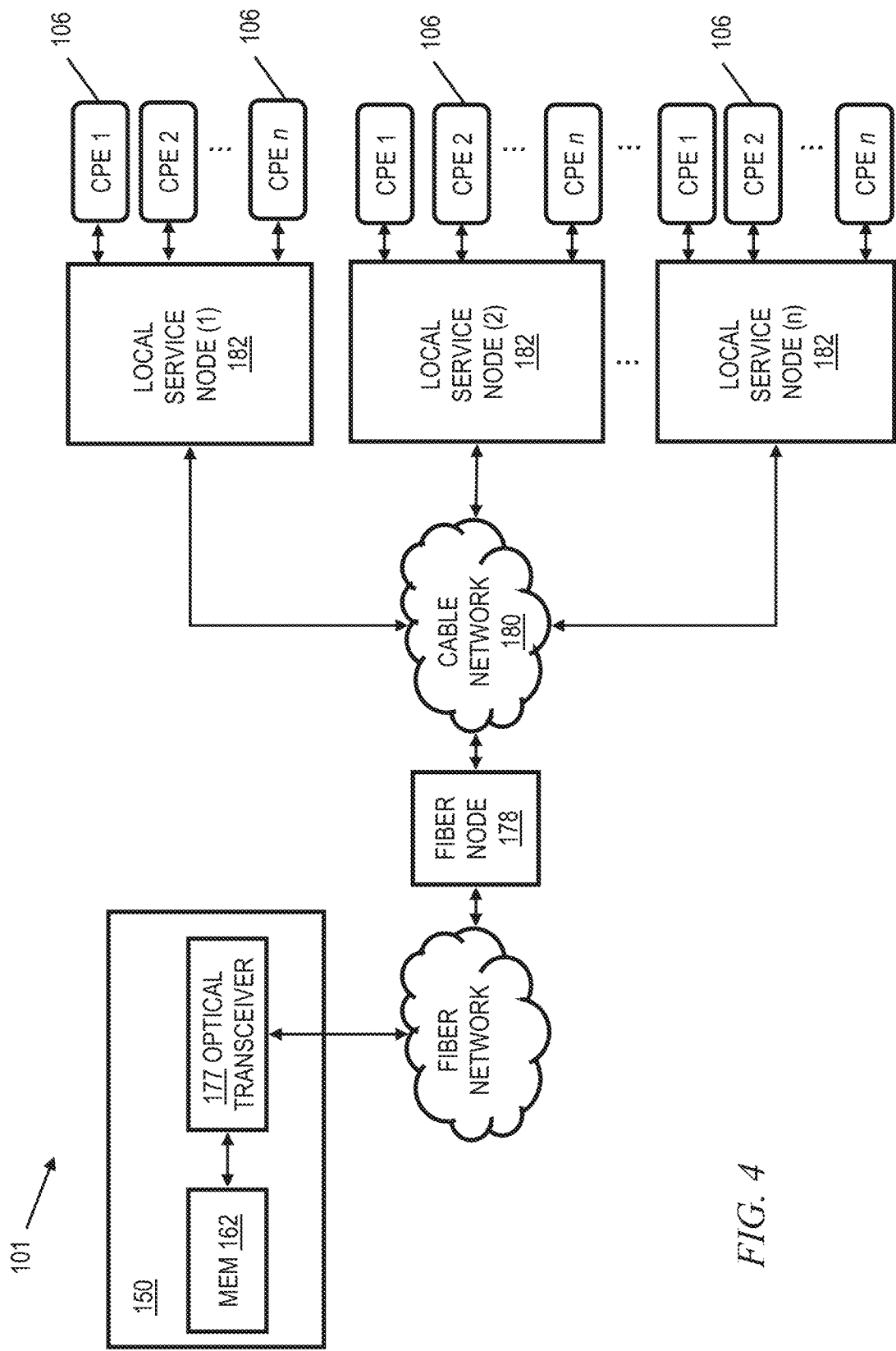
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
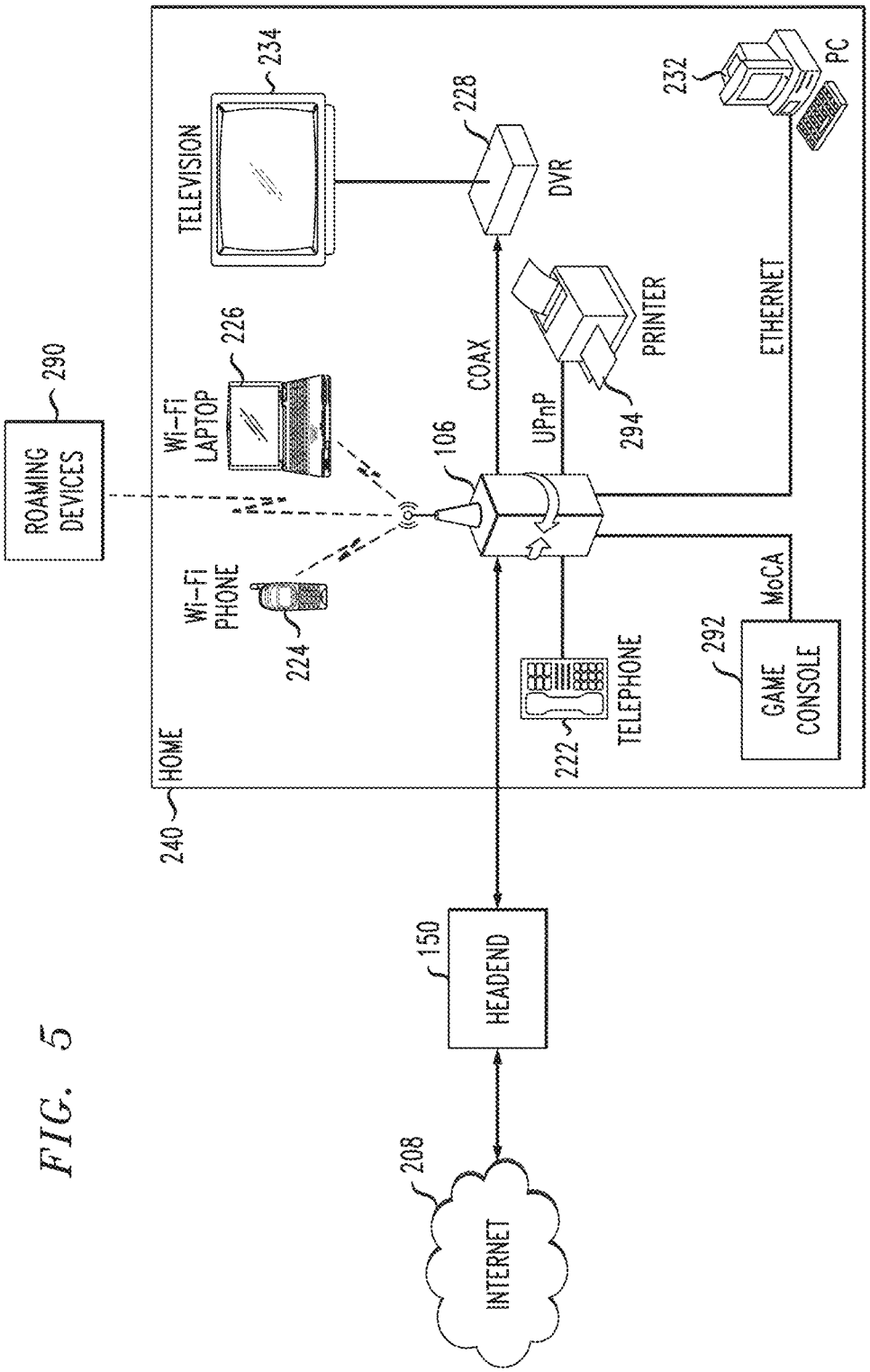
FIG. 5 is a functional block diagram of a premises network, including an exemplary centralized customer premises equipment (CPE) unit, interfacing with a head end such as that of FIG. 3.
Figure 6:
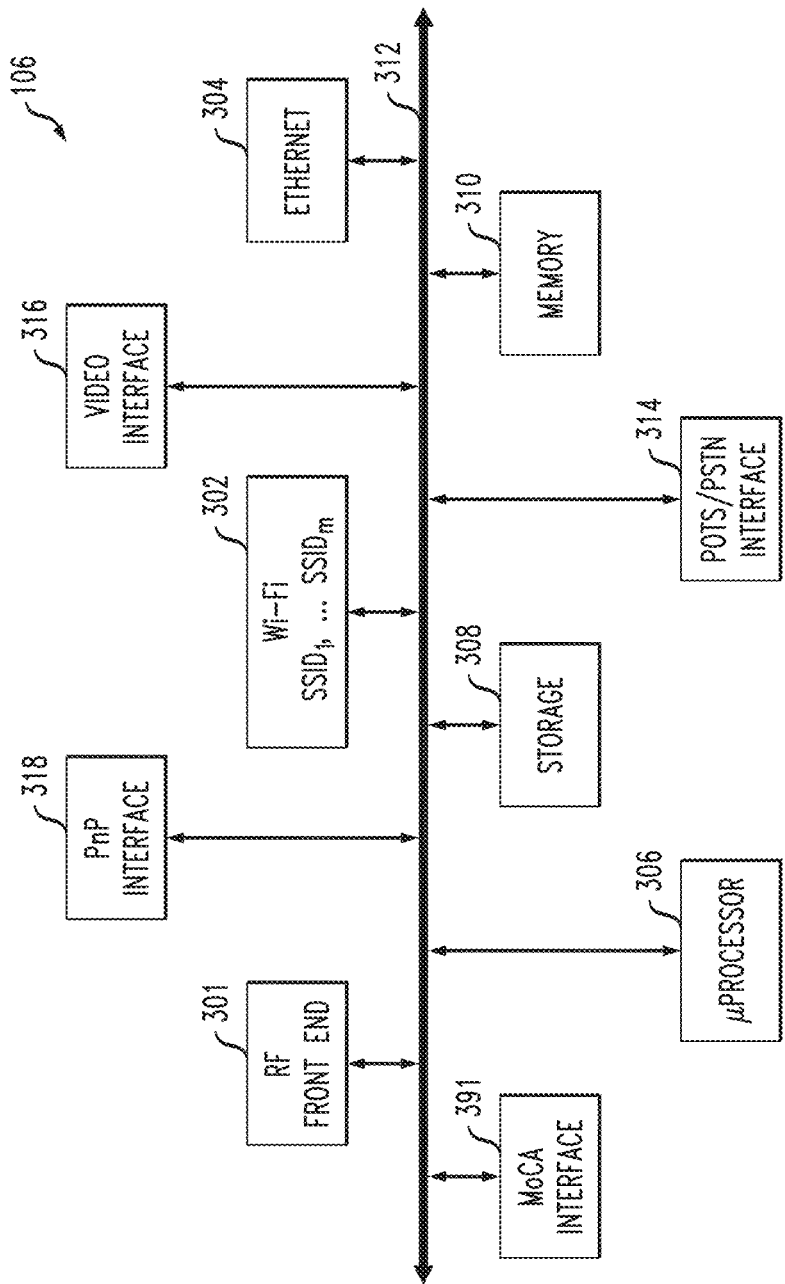
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
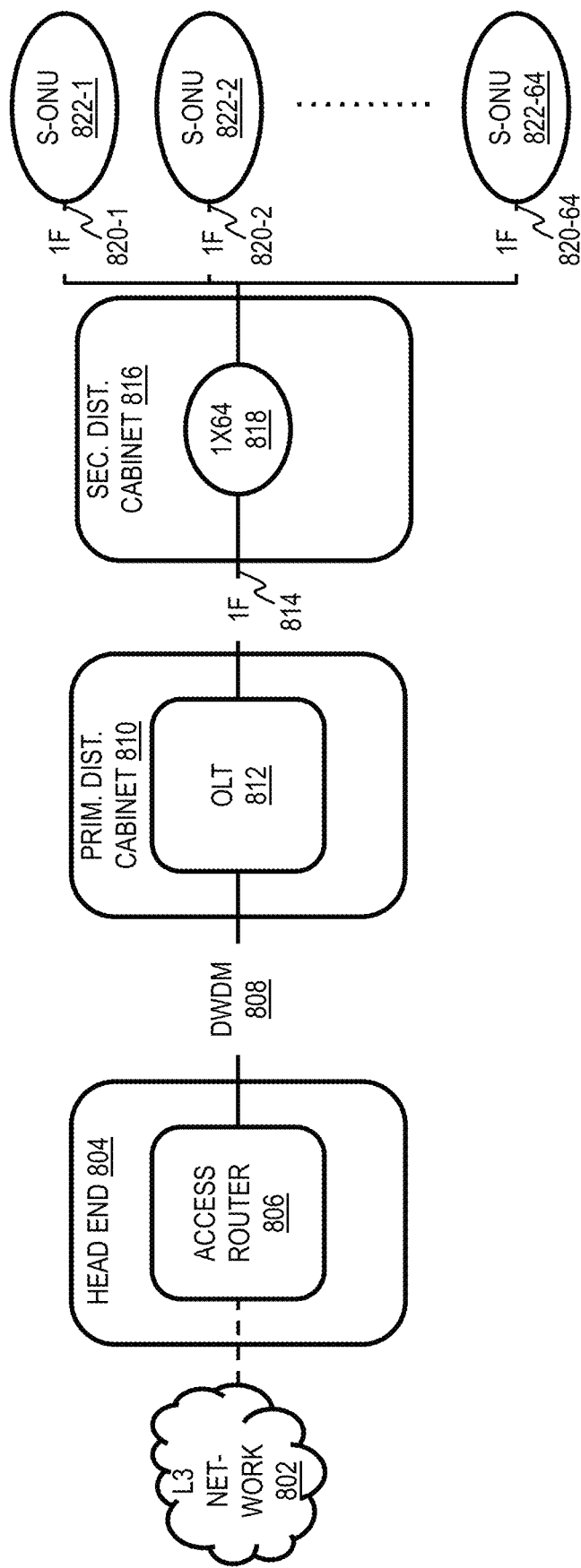
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
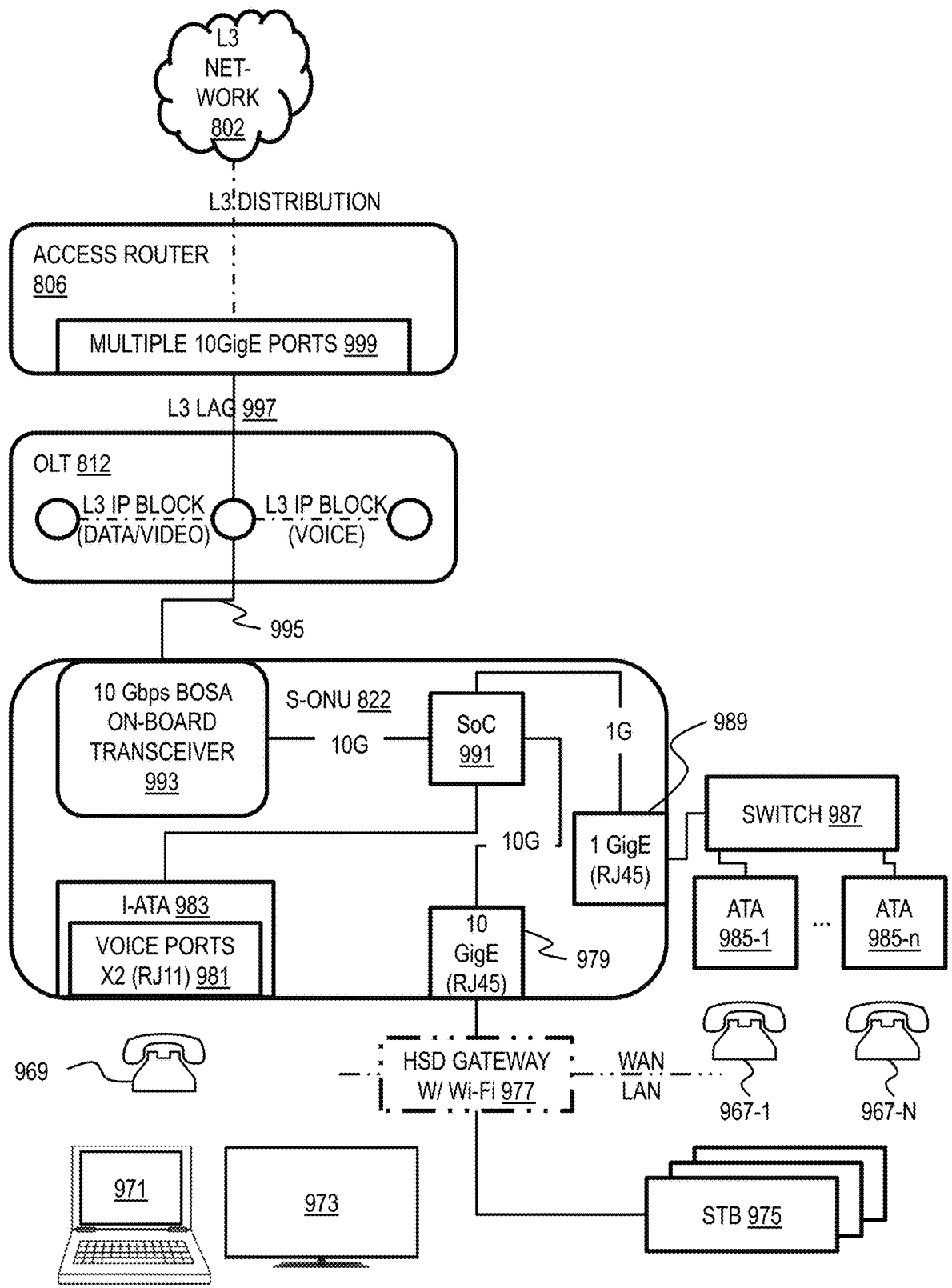
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

One or more embodiments advantageously use DHCP and a special file format to convey QoS and service information to customer equipment, to allow the equipment to self-configure and ensure that the equipment's policies are in accord with the ISP's ("ISP"=internet service provider) policies. This provides a way for an ISP to publish to customers (both residential and commercial) what their circuits are actually provisioned for. This allows, for example, residential routers to rate-shape correctly and/or to set up their own internal rate limiters. By way of a non-limiting example, the routers are provided with information needed to specify 50% of bandwidth for games, the remaining 50% to be allocated to material other than games. The information may also include, for example, when it is cheaper/better to carry out bulk work (e.g. backups and the like). Commercial customers can be provided with similar information; for example, regarding their potential classes of service (gold, silver, bronze), with the file denoting the provisioned rates and what QoS markings are required for the ISP to honor those settings. This file format and DHCP option advantageously enable a router to self-configure many things that have heretofore caused a degraded customer experience because of lack of knowledge or incorrect configuration.

One or more embodiments advantageously provide a way for a service provider to authoritatively tell a customer what the customer's circuit provisioning is; in one or more non-limiting examples, dynamic host control protocol (DHCP) is employed. For example, the customer requests a DHCP address as usual. The service provider hands back a new DHCP option that contains a pointer to a file. The customer may then download this file which contains all the parameters for the circuit, in one or more embodiments.

Furthermore in this regard, one or more embodiments provide a DHCP option advertising QoS policy. A DHCP option code can be assigned, for example, by the Internet Assigned Numbers Authority (IANA). Referring to FIG. 13, the data can be a URL containing either a tftp://, http://, or https://pointer to a QoS policy definition file; exemplary files are discussed below. Routers can take this information, download the policy, and either auto-configure their wide-area network (WAN) policies to adapt, or show the policy in their graphical user interfaces (GUIs) for user reference and verification that the service is configured correctly.

In one or more embodiments, the QoS definition file is a JSON (JavaScript Object Notation) formatted file providing details regarding the QoS definitions that are configured for a given service. This file is simple enough to be used for residential cable modem customers, yet has enough flexibility for commercial customers with complex QoS setups. The file starts with a JSON array with parent keys "service", "policy-sets", "policies".

Section "service"—The "service" section defines a certain set of constraints, and what policy set is active during those constraints. A constraint can be time-of-day or bandwidth based. A default service "default" is specified, with type "default". Under the "service" array are a series of keys that provide a human-readable indication of the purpose. "Daytime", "Nighttime", "Overlimit", "Normal", etc. are non-limiting examples. These keys contain service-entry objects.

service-entry—This contains two required keys (more or fewer keys could be used in other embodiments):

1. "type", with present values "default" which is used when no other policies apply (or as the only policy), "tod" for time-of-day and "bandwidth" for bandwidth usage constraints.
2. "policy", which defines which policy-set is active with these constraints.

service-entry: default—There are no additional parameters required for this type. service-entry: tod—When "tod" is defined, there is a nested "tod" object, which carries the following attributes:

"recurrence"—Optional—A recurrence string in RFC 5545 section 3.3.10 format. For example, a policy that repeats every weekday may be represented as "FREQ=WEEKLY;BYDAY=MO,TU,WE,TH,FR".

"start"—Required—The start date and time for this policy, based on the Date-Time attribute from RFC 5545, section 3.3.5, with only UTC times permitted (other time formats could be allowed in other embodiments). Example, "20180328T080000Z" for Mar. 28, 2018, at 08:00 UTC. Note, in general, items identified in this example as "Required" might be optional in other embodiments.

"duration"—Required—The duration of the window for this TOD. This format is based on the Duration attribute from RFC 5545, section 3.3.6, with only (other values could be allowed in other embodiments) positive values permitted. Example, "P9H" for 9 hours.

service-entry: bandwidth—When "bandwidth" is defined as the type, there is a nested "bandwidth" object that carries the following information. This type is used to define a new policy that gets applied after a certain bandwidth threshold is met.

"countfrom"—Required—The start date and time from when the bandwidth meter starts counting, specified as a Date-Time from RFC 5545 (B. Desruisseaux, Ed., RFC 5545—Internet Calendaring and Scheduling Core Object Specification (iCalendar) September 2009 is hereby expressly incorporated herein by reference in its entirety for all purposes).

"interval"—Required—The interval which the bandwidth total resets, specified as a Duration from RFC 5545. Example, "P1M" for monthly (or "P30D" for every 30 days, etc.)

"startlimit"—Required—The number of bytes after which this service-entry is in effect. Example, "100000000000" for 100 GB.

"endlimit"—Optional—The number of bytes after which this service-entry is no longer in effect. It is presumed there would be another bandwidth entry for the next "tier".

Section "policy-sets"—The policy-sets array includes keys with names referenced by the service-entries, above, and values including a JSON list of policies, specified in the "policies" described below. This helps reduce clutter when multiple policy sets are in use that carry mostly the same information. The listed policies are evaluated in order until the first match is found. If no match is found, the keyword "default" policy is to be used.

Section "policies"—Each policy is keyed by a name referenced in policy-sets, may have a "match" and must have an "action" section. If no "match" section is present, it is assumed that everything matches. The special policy "default" must have no match section. Note, in general, items identified in this example as "must" might be optional in other embodiments.

policies: match—Defines the match criteria for the given policy. Keys and values in the match object may contain, for example, any or all of the elements listed below. In other embodiments, this field may contain additional keys; that is to say, other embodiments may include additional or alternative match criteria.

"traffic-class"—One of the keywords "gold", "silver", "bronze". These reference a user-defined traffic class (for example, the user may configure the user's VoIP traffic to be "gold").

"dst-prefixes-v4"—A list of CIDR-based IPv4 destination prefixes.

"dst-prefixes-v6"—A list of CIDR-based IPv6 destination prefixes.

"ip"—Either "4" or "6" for IPv4 or IPv6, respectively

"protocol"—The integer IP protocol number (e.g. 6 for TCP, 17 for UDP, 1 for ICMP)

"dst-port"—Destination port numbers (valid only with protocol=6 or 17)

policies: action—Defines the action the ISP will take with the traffic, which the router ideally should be aware of. The action object must contain a "type", and may contain other objects based on that "type"—as follows.

policies: action: type=drop—The ISP will drop this traffic. The router should not send it onward.

policies: action: type=forward—The ISP will forward this traffic. The forward type may include a "forward" object, which may contain one or more of the attributes "rate," "no-bandwidth," "mark," and "cost."

"rate"—The maximum service rate the ISP will provide this traffic, in b/s.

"no-bandwidth"—Only valid value, if present, is "true", which means this traffic is not counted towards any bandwidth constraints. In other embodiments, this parameter might be defined to have other valid values "mark"—In order for this policy to be handled correctly, the ISP requires, for example, the traffic to be marked as per the object with the following fields:

"dscp"—The DSCP value must be set to the specified decimal value.

"8021p"—The 802.1p bits, if present, must be set to the specified decimal value.

"cost"—An object that defines the amount the ISP will bill the customer for this traffic. This is represented by "units", where it is presumed the ISP will bill for every unit or fractional unit used. The object contains the following attributes:

"currency"—The ISO code of the currency used for billing

"unit-cost"—A floating point denoting the amount per unit

"unit-bytes"—The number of bytes in a 'unit'

For residential customers, who tend to be on a basic cable modem, this will be a fairly simple file in one or more embodiments; for example, "your speed is 150 Mbps up and 20 Mbps down"; "you have a data cap of 2 Terabytes"; and so on. In some instances, there are provisions to specify that "web sites X, Y, and Z are excluded" and/or "times A, B, and C are excluded." Time limits are more common in European applications, but this is not a limitation. For example, midnight to six may be a special time when data usage is encouraged because of low demand.

For commercial customers, the file may be more complex because it typically also specifies the customers' QoS configuration. For example, "you have 3 tiers of service: gold, silver and bronze with us"; "here is how we treat them" (say the commercial customer has a 100 Mbps circuit with 30 Mbps gold, 40 Mbps silver, and 30 Mbps bronze). For purposes of automation, in one or more instances, the file also tells the customer how to mark the traffic so that it is correctly interpreted as gold, silver or bronze. For example, mark outbound gold traffic with Differentiated Services Code Point (DSCP) value "46" or IEEE 802.1p value "5"; in this manner, the customer's router knows how to configure the circuit completely automatically on its own. Heretofore, the customer or the customer's network engineer would have had to try to interpret what the ISP has communicated verbally or in writing (typically not electronically) and configure the customer's equipment to match what they believed the ISP was doing. In contrast, in one or more embodiments, the ISP informs the customer's equipment exactly what it is doing and the customer's equipment will know that it has gold, silver and bronze and can prompt the customer to determine what the customer desires to do. For example, the customer may desire to utilize the "gold" tier for telephone service, with lesser tiers for other items. In this way, the customer's router will match what the ISP is expecting.

The residential side can be similar in some cases. For example, there may be a one or two Terabyte data cap limit and a warning can be e-mailed to the customer if, for example, the customer is within 5% (or other predetermined amount) of the limit with, say, 5 days (or other predetermined amount of time) left in the month. In another aspect, there may be a "low rate" time between midnight and 6 AM or some other low-demand period, so it may be desirable to advise cloud servers, backup storage, etc. that it is a good time for backups/downloads.

Non-limiting examples will now be provided of files for a residential cable modem and a commercial 3-class customer; these are written in JSON (JavaScript Object Notation), but this is a non-limiting example. A JSON file is an array of information; a plurality of key, value pairs. Arrays and lists can be defined therein.

Example Policy File—Residential Cable Modem—Refer first to FIGS. 14A and 14B, for a residential cable modem. This non-limiting example assumes a customer with 35 Mb/s service, a 100 GB data cap, who is billed an additional $5 per 5 GB used. The ISP decides not to bill for traffic to its billing and support websites, at prefix 192.168.50.0/24, or for traffic in the "quiet-hours" between 3 am and 6 am UTC every day (during which time the ISP gives a speed boost to 45 Mb/s). The file can be stored, for example, on a web server of the ISP where it is available for download. Three services are defined; the "default" service 1401 runs at any point any other service is not applied; the "S-quiethours" service 1403 takes effect during specified quiet hours (e.g. from 3 am-6 am each day); and the "S-exceed" service runs when the specified bandwidth limit is exceeded. As seen at 1407, a special policy is provided for exempted traffic to the billing and support site, which is re-used in both policy-sets (default 1409 and exceeds 1411) that are not the quiet hours 1413. At 1415, define the exempt policy, with the required prefix and the "no-bandwidth" flag; the rate is 35 Mbps, as seen at 1417. At seen at 1419, the "exceeds" policy continues to forward at 35 Mb/s, but bills $5 per 5 GB. In other approaches, the speed could be degraded and/or the additional charge ($5) and/or unit associated with the additional charge (5 GB) could be different.

As seen at 1423, the "quiet hours" involve no billing, do not count towards bandwidth usage, and have increased speed (45 MB/s) as seen at 1425. A "very smart" device may opt to do upgrades, download ISO files, utilize BitTorrent or other peer-to-peer file sharing, or do backups at this time. At 1427, define the default policy as forwarding at 35 Mb/s.

Figure 15B:
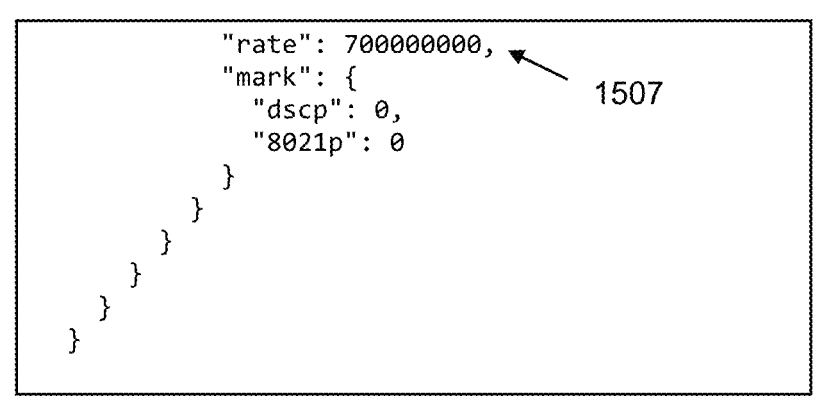

Example Policy File—Commercial 3-class customer—Refer now to FIGS. 15A and 15B, for a commercial 3-class customer; in this non-limiting example, the file is simpler than the residential case, because there are no bandwidth caps or quiet hours. This customer has a 1 Gb/s circuit. The ISP permits up to 10% gold traffic and 20% silver traffic, and that traffic must (in this non-limiting example) be marked as CS4 for gold, CS2 for silver, and CS0 (best efforts ("BE")) for the rest. At 1501, define default, gold, and silver tiers. At 1503, specify to forward gold at 100 Mbps and to mark gold traffic with a DSCP of 32 or 802.1p of 4; the router will thus know exactly how to tag traffic going out to the ISP so that it is counted and handled correctly. Similar definitions for silver and default are seen at 1505 and 1507, respectively. In a non-limiting example, a 1 Gb circuit is broken rigidly into three "chunks"—100 Mb must be gold, 200 Mb must be silver, and 700 Mb must be default. In an alternative approach, an ISP allows "up to" 100 Mb of traffic to be marked gold, another "up to" 200 Mb of traffic for silver, and anything left over can be used for default (i.e. a customer may, at a given instant, use 10 Mb gold, 20 Mb silver, and 970 Mb default, and be in compliance; indeed, in this aspect, all 1 Gb could be default/best efforts if desired).

It is worth noting that one or more embodiments are generally applicable to ISPs and are not specifically limited to HFC environments—many different types of physical plant can be employed. Indeed, one or more embodiments are even applicable to cloud providers.

Figure 10:
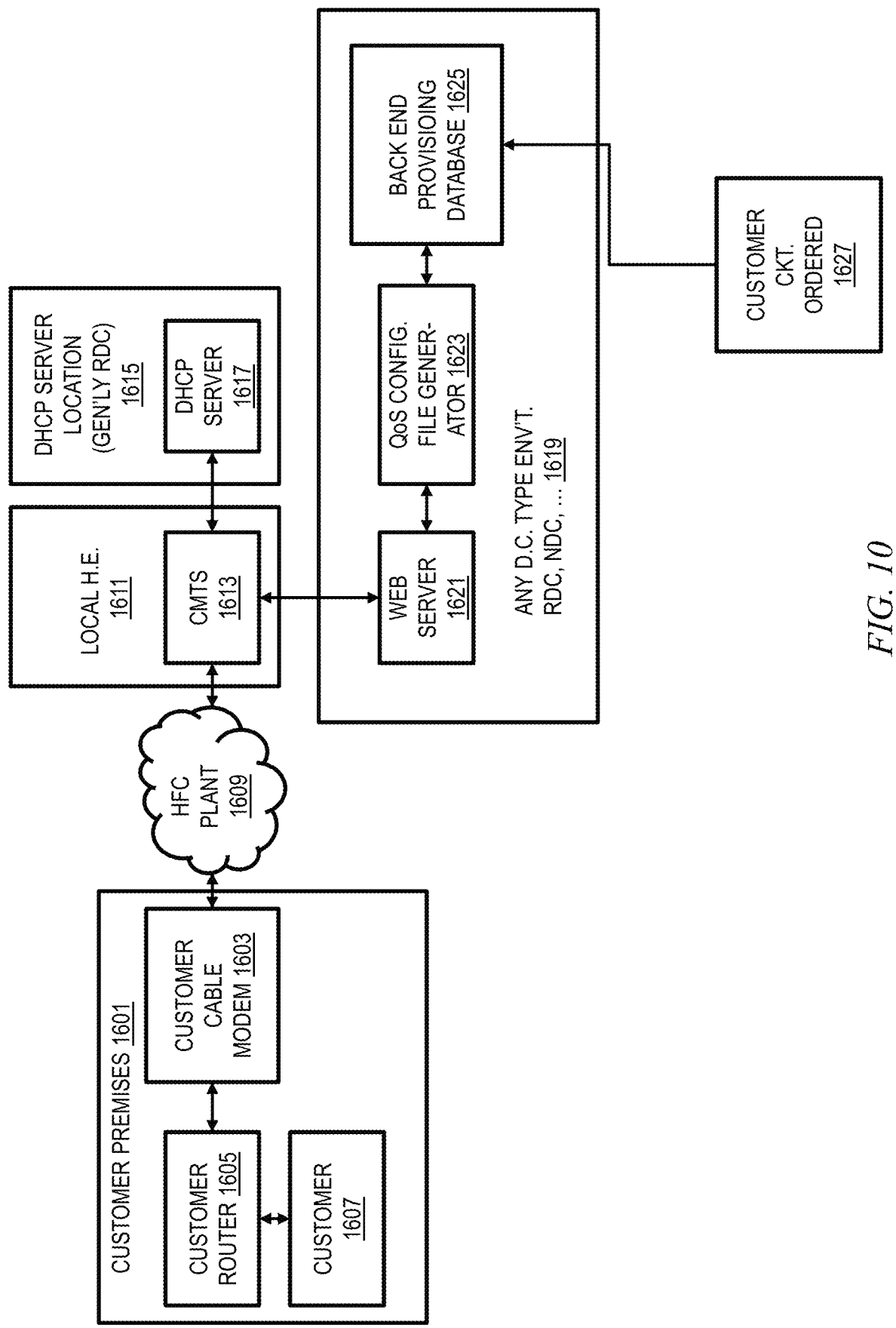
FIG. 10 is a block diagram of a system, according to an aspect of the invention, within the context of an HFC network.

As noted, embodiments of the invention can be employed in a variety of network environments; HFC and FTTP are non-limiting examples. FIG. 10 shows an exemplary implementation in the context of an HFC network. Customer 1607 in premises 1601 (analogous, e.g., to location 240) plugs in or starts up his or her router 1605, which is connected to a cable modem 1603 (part, for example, of unit 106). As router 1605 starts up, it sends out a DHCP request as usual, which goes through the cable modem 1603, the HFC plant 1609 (generally analogous to network 101), and to the CMTS 1613 (analogous to unit 156) in local head end 1611 (analogous to location 150). In most service provider deployments, the CMTS does not handle DHCP directly by itself (although in very small providers it could), and it will instead forward the request over to the DHCP Server 1617 in location 1615. Note that location 1615 could, for example, correspond to an RDC 1048, but other locations could be used (e.g., FIG. 3 shows an alternative location of DHCP server 3304 in head end 150; location in a national data center 1098 is possible; a variety of locations are possible as long as suitable connectivity to the customer is available). Either way (whether CMTS 1613 is answering the request or the DHCP server 1617 is answering the request), the reply comes back with a new DHCP option code that provides a URL from which to download circuit configuration information. This reply goes back to the Customer Router 1605.

Customer Router 1605 carries out a download of the URL provided in the DHCP request. This may be, for example, an HTTP or HTTPS transaction that goes through the cable modem 1603, HFC Plant 1609, CMTS 1613, and over to either a dedicated or a shared web server 1621. This web server generally will have a script that generates the configuration file on an as-needed basis. It does this by using a configuration file generator 1623 (which could be, for example, a local script or a separate appliance). The generator 1623 references data the service provider already has for circuit provisioning in a variety of backend databases 1625. The databases 1625 are populated by the normal circuit or service generation process 1627. The web server 1621 replies back to the customer router 1605 with the generated file from generator 1623. The customer router 1605 then can use the information to set up its parameters, including WAN speeds, enabling alerting of customer 1607 regarding bandwidth cap thresholds, and can provide this information (e.g. via email or a GUI) to the customer 1607.

Units 1621, 1623, and 1625 can be located, for example, in any suitable data center type environment 1619; RDC 1048 and NDC 1098 are non-limiting examples.

Figure 11:
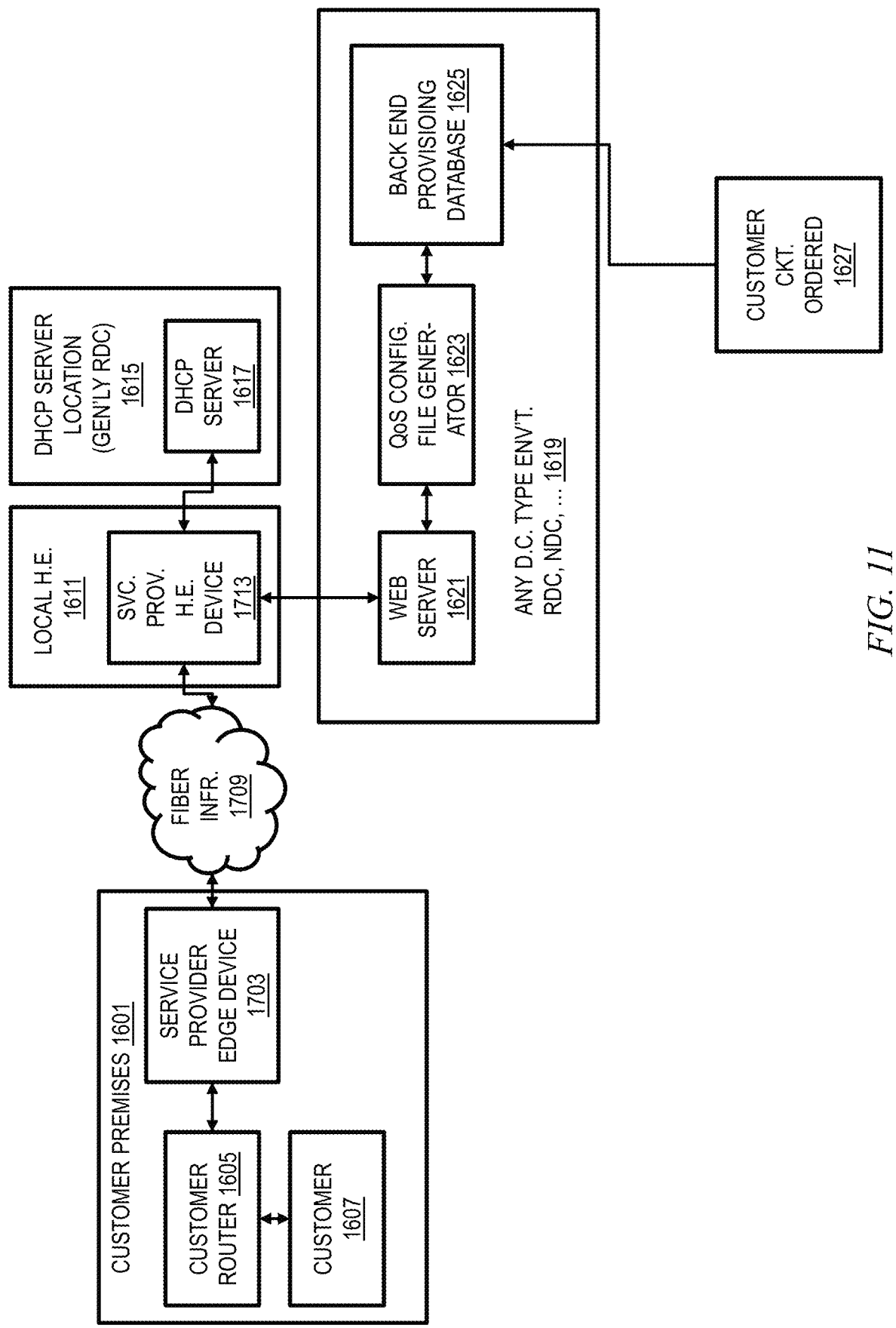
FIG. 11 is a block diagram of a system, according to an aspect of the invention, within the context of an FTTH network.

FIG. 11 shows an exemplary implementation in the context of a fiber network. Elements similar to those in FIG. 10 have received the same reference character, and data flows are generally analogous. In this case, the cable modem 1603 is replaced with service provider edge device 1703 (whatever device the service provider is using for fiber termination (e.g., S-ONU 822)); the infrastructure 1709 is analogous to the components 808, 810, 812, 814, 816, 818 in FIG. 8; and the CMTS 1613 is replaced by service provider head end device 1713 (e.g. access router 806). Premises 1601 are analogous to premises containing S-ONU 822; and local head end 1611 is in this case analogous to head end 804.

Figure 12:
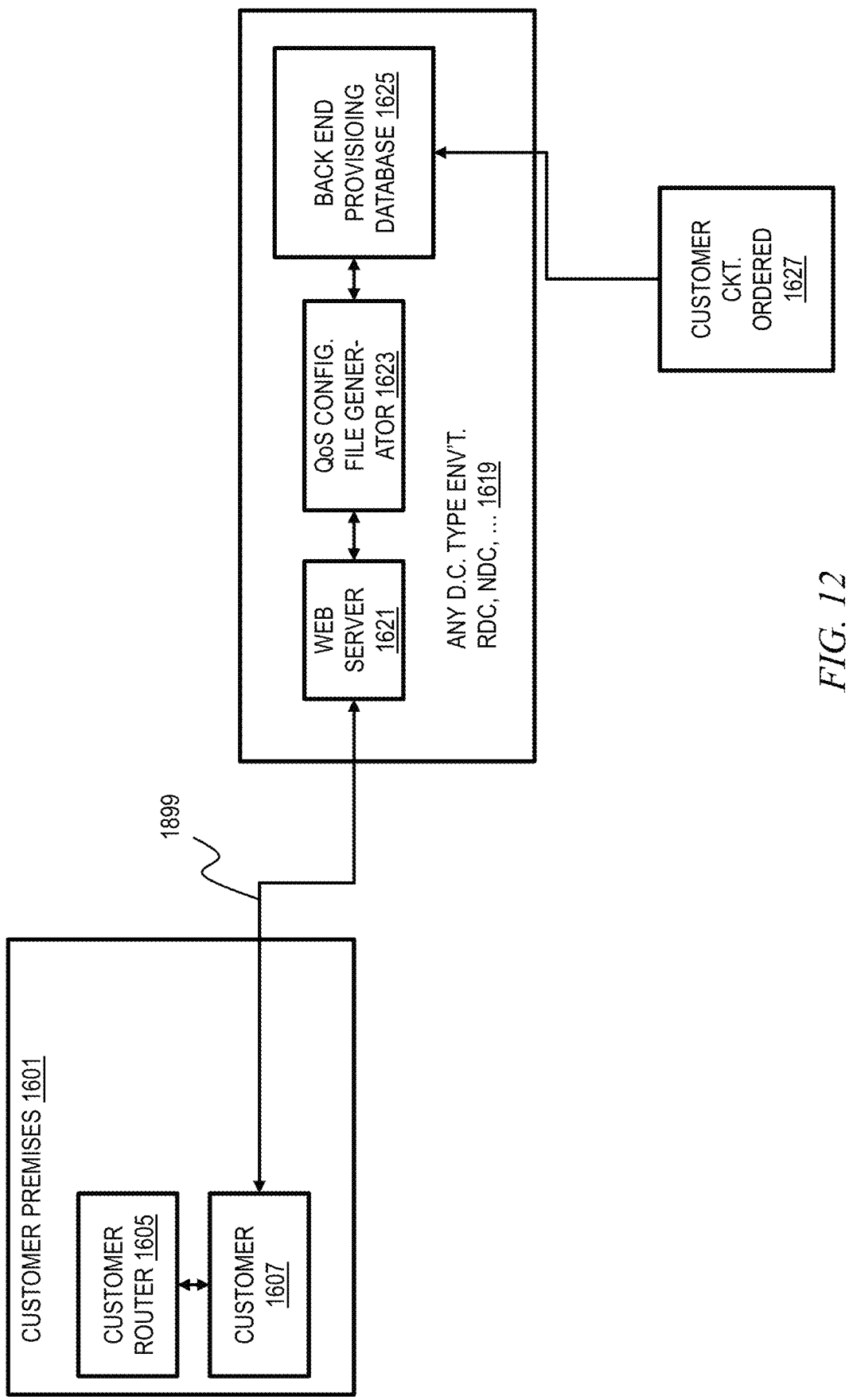
FIG. 12 is a block diagram of a system, according to an aspect of the invention, employing an out-of-band communication aspect.

FIG. 12 shows an alternative embodiment wherein the customer 1607 is provided with the URL for the configuration through an out-of-band technique 1899 (e.g., verbally, through the contract, via an email link, or other suitable technique). Elements similar to those in FIG. 10 have received the same reference character. As in FIG. 10, web server 1621 generally will have a script that generates the configuration file on an as-needed basis. It does this by using a configuration file generator 1623 (which could be a local script or a separate appliance). The generator 1623 references data the service provider already has for circuit provisioning in a variety of backend databases 1625. The databases 1625 are populated by the normal circuit or service generation process 1627. The web server 1621 provides the customer 1607 with the configuration file at 1899. The customer 1607 then proceeds to send the configuration file to customer router 1605 by a web interface, by copying the file to a USB thumb drive and inserting it into the router, or by another file exchange mechanism.

Given the teachings herein, including the exemplary configuration files, the skilled artisan can readily implement the configuration file generator 1623 as a local script or on a separate appliance. By way of a non-limiting example, JSON is a language-independent data format, and many programming languages include code to generate and parse JSON-format data. In one non-limiting example, a basic QoS configuration file generator is implemented as a simple programming script that queries a service provider's provisioning system to get the basic speed of the customer circuit, and simply inserts that value into a pre-built JSON template file to hand out to the clients. In another non-limiting example, a more complex QoS configuration file generator is implemented as a full computer program which connects with a service provider's provisioning system and extracts more detailed information regarding a customer's circuit, including speeds, any restrictions, any required traffic markings, and any exceptions. The program then takes this data and dynamically constructs a text file including a JSON-formatted representation of all of that information for presentation to the clients.

In each of FIGS. 10, 11, and 12, once the customer router 1605 has the data, it can pre-configure itself, and offer options and information through its GUI to the customer 1607.

Recapitulation

Given the discussion thus far, it will be appreciated that, in general terms, an exemplary method, according to an aspect of the invention, includes receiving (e.g. by an ISP) a request (e.g., a dynamic host control protocol (DHCP) request) from a customer premises equipment (e.g. router 1605) of a customer 1607. A further step includes responding to the request with a pointer (e.g., a uniform resource locator (URL)) pointing (see e.g. FIG. 13) to a configuration file (see e.g. FIGS. 14A, 14B, 15A, and 15B) containing circuit configuration information for the customer. A still further step includes generating the configuration file; and even further step includes, responsive to the CPE of the customer accessing the pointer, serving the configuration file out to the CPE of the customer 1607. Yet a further step includes treating subsequent internet traffic from the customer in accordance with the configuration file. In some instances, the configuration file is generated in response to the CPE of the customer following the pointer.

It should be noted as an aside that in one or more embodiments, the back end provisioning database 1625 pushes to both the QoS configuration file generator 1623, and also pushes the configuration to the production network. Other deployment modes can also be used, however. For example, in some cases, the network is configured by a human, using the information in Customer Circuit Ordered block 1627; the same human may, for example, populate database 1625 or variants thereof.

It is worth noting that in one or more embodiments, pertinent aspects are the file the DHCP server hands a pointer to, and the usage of that file. The DHCP server 1617 provides a link to the file, the ISP's web server 1621 provides the file, and the customer device 1605 receives and installs it. The file itself (listed as being on the web server), and instructions on where to get it (listed as the DHCP server pointer) are non-limiting exemplary implementations. In alternative approaches, this file could just be emailed to a customer and the customer would load it on his or her device. The file could be sent via being placed on a USB stick and mailed to the customer. Similarly, any customer device that connects to the circuit could use it, whether that device is technically a router 1605, a firewall, a virtual appliance, a computer by itself, etc.

In one or more embodiments, the customer reconfigures the customer's network based on the contents of the provisioning file. For example, the customer equipment (e.g. router, firewall, or the like) notes that high-priority traffic should be marked "gold" in a certain manner. The customer's router may, for example, then configure itself to mark its voice traffic (VoIP) as gold. The router, firewall, etc. may also make the customer aware of the "silver" level and ask the customer what traffic to assign to that level. In a non-limiting example, the customer could choose to place relational database transactions and/or mission-critical data transfers into the "silver" tier. The provisioning file instructs the router how to manipulate the data packets from, e.g., the VoIP network; i.e., how to change the data packets and put the correct markings on them so that the ISP will handle with the appropriate priority. Stated in another way, a data packet from the customer's internal network arrives at the customer's router; based on the instructions in the provisioning file, the router makes the appropriate changes to the data packet so that it is treated with the correct priority by the ISP. The ISP then switches the packets through its network with a priority corresponding to the changes made by the customer's router. Refer back to the above discussion of Differentiated Services Code Point (DSCP) and/or IEEE 802.1p values, for example.

In another aspect, the provisioning file can be used on the ISP's side; for example, the CMTS 1613, head end device 1713, router on the ISP side, etc. can use the file to provision itself so that it also matches what the customer has; in essence, the ISP also reconfigures its network based on the contents of the provisioning file.

It should also be noted that the format of the configuration file set forth herein is exemplary; other embodiments could be structured differently. For example, "services" could be referred to as "profiles"; XML could be sued instead of JSON, and the like. Also, the configuration file can alternatively be thought of as a specification file; the customer can upload the specification to the customer's router or other CPE and the router uses the specification and generates its own configuration automatically, in some instances.

In one or more embodiments, in the step of receiving the request from the customer premises equipment of the customer, the request includes a dynamic host protocol configuration (DHCP) request and the customer premises equipment of the customer includes a router 1605; and/or in the step of responding to the request with the pointer, the pointer includes a uniform resource locator (URL) pointing to the configuration file.

In one or more embodiments, the router 1605 of the customer 1607 is configured in accordance with the configuration file. For example, configuring the router can include the router auto-configuring wide-area network (WAN) policies of the router in accordance with the configuration file; and/or the router communicating policies contained in the configuration file to the user (e.g. customer 1607).

In some instances, generating the configuration file includes generating the configuration file as a JSON (JavaScript Object Notation) formatted file having parent keys: service, policy-sets, and policies. For example, generating the configuration file can include generating the configuration file with a service section, a policy-sets array, and a policies section. The service section corresponds to the service parent key, and the service section defines a set of constraints including at least one of bandwidth (e.g., exceed, gold, silver, and default services as discussed above) and time of day constraints (e.g. quiet hours as discussed above). The service section further specifies corresponding policies active during the set of constraints. Use can be made of Differentiated Services Code Point (DSCP) values and/or IEEE 802.1p values as discussed above.

Policies provide instructions on how to handle a specific set of traffic. Policy-sets combine those individual instructions (policies) into a full set of instructions for traffic handling, which cover all traffic that can be sent. Services map sets of conditions to policy-sets to allow the device to know which set of instructions are to be used at a given moment or condition, with a (in at least some cases, mandatory) "default" service acting as a catch-all if none of the other service conditions match. Thus, in one or more embodiments, the policies section specifies a plurality of instructions, each for handling a specific portion of the internet traffic; the policy-sets array combining the instructions from the policies section to address handling of all of the internet traffic; and a service section mapping sets of conditions to the policy-sets to allow the router to determine which of the instructions are to be used at a given time and/or condition, wherein a "default" service is provided (e.g., in case no other ones of the instructions match).

In one or more embodiments, the step of responding to the dynamic host control protocol (DHCP) request with the uniform resource locator (URL) is carried out by a dynamic host control protocol (DHCP) server 1617 at location 1615. However, as noted, in some cases, the step of responding to the dynamic host control protocol (DHCP) request with the uniform resource locator (URL) is carried out by a cable modem termination system 1613 or an optical network service provider head end device 1713 such as an optical network access router 806. The DHCP request can ultimately be received and acted on, at the ISP, at the DHCP server or cable modem termination system/optical network service provider head end device, as the case may be. Indeed, the CMTS (or GPON device, or anything else in the way) can intercept the DHCP reply containing the pointer to the configuration file, and itself use that for its own configuration.

In some cases, the configuration file is generated with a script on a web server 1621. The script may access back end provisioning databases 1625.

In some embodiments, the configuration file is generated with a configuration file generator 1623 running on a separate appliance coupled to a web server 1621. The appliance may access the back end provisioning databases 1625.

It is worth noting that in one or more embodiments, the architecture depicted in FIGS. 10-12, in particular, the interplay of the QoS configuration file generator 1623 with the other elements such as 1621, 1625, has the technical benefit of seamless integration with existing systems. The QoS configuration file generator 1623 creates the provisioning file and functions as an abstraction layer to tie in to the existing back end provisioning databases.

In one or more embodiments, treating subsequent internet traffic from the customer in accordance with the configuration file includes switching data packets from the customer in accordance with indicators placed in the packets by the router in accordance with the configuration file. See discussion elsewhere herein of Differentiated Services Code Point (DSCP) values and/or IEEE 802.1p values.

As noted, the ISP can also use the configuration file, if desired. For example, treating of the subsequent internet traffic from the customer in accordance with the configuration file can be carried out by the internet services provider (ISP), which configures at least one item of network equipment of the internet services provider (ISP) in accordance with the configuration file. Stated in another way, as noted elsewhere, the provisioning file can be used on the ISP's side; for example, the CMTS 1613, head end device 1713, router on the ISP side, etc. can use the file to provision itself so that it also matches what the customer has; in essence, the ISP also reconfigures its network based on the contents of the provisioning file.

Furthermore, given the discussion thus far, it will be appreciated that, in general terms, another exemplary method, according to another aspect of the invention, includes obtaining, at customer premises equipment of a customer, from an internet service provider (ISP), a configuration file (see e.g. FIGS. 14A, 14B, 15A, and 15B)

containing circuit configuration information for the customer. A further step includes configuring the customer premises equipment of the customer in accordance with the configuration file. An even further step includes the configured customer premises equipment of the customer routing traffic in accordance with the configuring step.

One or more embodiments further include dispatching a request from the customer premises equipment of the customer to the internet services provider (ISP); and, responsive to the request, obtaining, at the customer premises equipment of the customer, from the internet services provider (ISP), a pointer to the configuration file. Obtaining of the configuration includes following the pointer.

In some instances, in the step of dispatching the request, the request includes a dynamic host protocol configuration (DHCP) request and the customer premises equipment of the customer includes a router; and/or in the step of obtaining the pointer, the pointer includes a uniform resource locator (URL) pointing to the configuration file.

In one or more embodiments, the configured customer premises equipment of the customer routing traffic in accordance with the configuring step includes placing indicators in packets of the traffic in accordance with the configuration file. See discussion elsewhere herein of Differentiated Services Code Point (DSCP) values and/or IEEE 802.1p values.

The skilled artisan will appreciate that DHCP has a numeric code for every provided option. In a non-limiting example, an authority such as the Internet Assigned Numbers Authority (IANA) could assign a corresponding number. The DHCP response could then include the appropriate numerical code to flag the response as a provisioning file.

In another aspect, an exemplary customer premises equipment (CPE) device includes a memory; at least one processor coupled to the memory; and a non-transitory persistent storage medium that contains instructions (e.g. one or more software and/or firmware modules) which, when loaded into the memory, configure the at least one processor to obtain, from an internet service provider (ISP), a configuration file containing circuit configuration information for a customer corresponding to the customer premises equipment (CPE) device; configure the customer premises equipment (CPE) device in accordance with the configuration file; and route traffic in accordance with the configuring.

In some cases, the instructions contained in the non-transitory persistent storage medium, when loaded into the memory, further configure the at least one processor to dispatch a request to an internet services provider (ISP); and, responsive to the request, obtain, from the internet services provider (ISP), a pointer to the configuration file. Obtaining of the configuration file includes following the pointer.

In some cases, the request includes a dynamic host protocol configuration (DHCP) request and the customer premises equipment (CPE) device includes a router; and/or the pointer includes a uniform resource locator (URL) pointing to the configuration file.

In one or more embodiments, the at least one processor routes the traffic by placing indicators in packets of the traffic in accordance with the configuration file. See discussion elsewhere herein of Differentiated Services Code Point (DSCP) values and/or IEEE 802.1p values.

Figure 7:
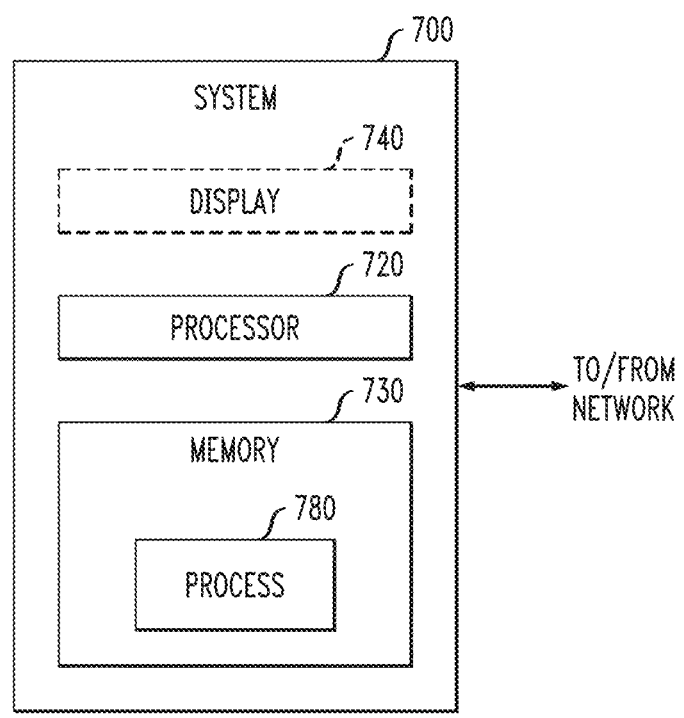
FIG. 7 is a block diagram of a computer system useful in connection with one or more aspects of the invention.

Router 1605 is a non-limiting example of CPE; FIG. 7 and its description, although directed to a general-purpose computer or server, are also indicative of the manner in which the instructions contained in the non-transitory persistent storage medium, when loaded into the memory, would configure a processor of the router to act as described.

In still another aspect, an exemplary system includes a dynamic host control protocol (DHCP) server 1617 of an internet services provider (ISP); a router of the internet services provider (ISP) (element 1008 is a non-limiting example); a back-end provisioning database 1625 of the internet services provider (ISP); a quality of service (QoS) configuration file generator 1623 coupled to the back-end provisioning database; and a web server 1621 of the internet services provider (ISP), coupled to the quality of service (QoS) configuration file generator the dynamic host control protocol (DHCP) server receives a dynamic host control protocol (DHCP) request from customer premises equipment of a customer of the internet services provider (ISP); the dynamic host control protocol (DHCP) server responds to the request with a pointer to a configuration file containing circuit configuration information for the customer; and the quality of service (QoS) configuration file generator coupled to the back-end provisioning database generates the configuration file. Responsive to the piece of customer premises equipment of the customer following the pointer, the web server serves the configuration file out to the customer premises equipment of the customer; and the router of the internet services provider (ISP) switches subsequent data packets from the customer in accordance with indicators placed in the packets by the customer premises equipment of the customer in accordance with the configuration file. See discussion elsewhere herein of Differentiated Services Code Point (DSCP) values and/or IEEE 802.1p values.

The pointer could include, e.g., a uniform resource locator (URL) pointing to the configuration file.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

FIG. 7 is a block diagram of a system 700 that can implement at least some aspects of the invention, and is representative, for example, of one or more of the servers, routers, etc. shown in the figures; of course, a router, for example, will typically have a memory and processor but not a display. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on any of the programmable devices depicted in FIGS. 10-12 and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information. Aspects of the invention are not limited to routers; firewalls, appliances, and the like can also be employed; indeed, any device a customer could plug into the Internet connection.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement, as appropriate, all or portions of blocks/sub-blocks 1603/1703, 1605, 1613/1713, 1617, 1621, 1623, 1625). The method steps can then be carried out using the distinct software modules of the system, as described above, executing on one or more hardware processors of the corresponding elements. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
 receiving a request from customer premises equipment of a customer;
 responding to said request with a pointer to a configuration file containing circuit configuration information for said customer;
 generating said configuration file;
 responsive to said customer premises equipment of said customer following said pointer, serving said configuration file via a dynamic host protocol configuration (DHCP) response out to said customer premises equipment of said customer, said configuration file comprising a publication by an internet service provider (ISP)

of information describing a quality of service (QoS) of network resources provided by said internet service provider (ISP) to said customer premises equipment; and treating subsequent internet traffic from said customer in accordance with said configuration file.

2. The method of claim 1, wherein:

in said step of receiving said request from said customer premises equipment of said customer, said request comprises a dynamic host protocol configuration (DHCP) request and said customer premises equipment of said customer comprises a router;

in said step of responding to said request with said pointer, said pointer comprises a uniform resource locator (URL) pointing to said configuration file.

3. The method of claim 2, further comprising configuring said router of said customer in accordance with said configuration file.

4. The method of claim 3, wherein configuring said router includes said router auto-configuring wide-area network (WAN) policies of said router in accordance with said configuration file.

5. The method of claim 3, wherein configuring said router includes said router communicating policies contained in said configuration file to a user.

6. The method of claim 2, wherein generating said configuration file comprises generating said configuration file as a JSON (JavaScript Object Notation) formatted file having parent keys:
service,
policy-sets, and
policies.

7. The method of claim 6, wherein generating said configuration file comprises generating said configuration file with:
a policies section specifying a plurality of instructions, each for handling a specific portion of said internet traffic;
a policy-sets array combining said instructions from said policies section to address handling of all of said internet traffic; and
a service section mapping sets of conditions to said policy-sets to allow said router to determine which of said instructions are to be used at a given time and/or condition, wherein a default service is provided.

8. The method of claim 2, wherein said step of responding to said dynamic host control protocol (DHCP) request with said uniform resource locator (URL) is carried out by a dynamic host control protocol (DHCP) server.

9. The method of claim 2, wherein said step of responding to said dynamic host control protocol (DHCP) request with said uniform resource locator (URL) is carried out by at least one of a cable modem termination system and an optical network access router.

10. The method of claim 2, wherein said step of generating said configuration file includes generating said configuration file with a script on a web server.

11. The method of claim 10, wherein generating said configuration file with said script on said web server comprises accessing back end provisioning databases.

12. The method of claim 2, wherein said step of generating said configuration file includes generating said configuration file with a configuration file generator running on a separate appliance coupled to a web server.

13. The method of claim 12, wherein generating said configuration file with said configuration file generator running on said separate appliance coupled to said web server comprises accessing back end provisioning databases.

14. The method of claim 2, wherein treating subsequent internet traffic from said customer in accordance with said configuration file comprises switching data packets from said customer in accordance with indicators placed in said packets by said router in accordance with said configuration file.

15. The method of claim 2, wherein said treating of said subsequent internet traffic from said customer in accordance with said configuration file is carried out by said internet services provider (ISP), further comprising configuring at least one item of network equipment of said internet services provider (ISP) in accordance with said configuration file.

16. A method comprising the steps of:
obtaining, at customer premises equipment of a customer, from an internet service provider (ISP) via a dynamic host protocol configuration (DHCP) response, a configuration file containing circuit configuration information for said customer, said configuration file comprising a publication by said internet service provider (ISP) of information describing a quality of service (QoS) of network resources provided by said Internet service provider (ISP) to said customer premises equipment;
configuring said customer premises equipment of said customer in accordance with said configuration file; and
said configured customer premises equipment of said customer routing traffic in accordance with said configuring step.

17. The method of claim 16, further comprising:
dispatching a request from said customer premises equipment of said customer to said internet services provider (ISP); and
responsive to said request, obtaining, at said customer premises equipment of said customer, from said internet services provider (ISP), a pointer to said configuration file;
wherein said obtaining of said configuration file comprises following said pointer.

18. The method of claim 17, wherein:
in said step of dispatching said request, said request comprises a dynamic host protocol configuration (DHCP) request and said customer premises equipment of said customer comprises a router;
in said step of obtaining said pointer, said pointer comprises a uniform resource locator (URL) pointing to said configuration file.

19. The method of claim 16, wherein said configured customer premises equipment of said customer routing traffic in accordance with said configuring step comprises placing indicators in packets of said traffic in accordance with said configuration file.

20. A customer premises equipment (CPE) device comprising:
a memory;
at least one processor coupled to said memory; and
a non-transitory persistent storage medium that contains instructions which, when loaded into said memory, configure said at least one processor to:
obtain, from an internet service provider (ISP) via a dynamic host protocol configuration (DHCP) response, a configuration file containing circuit configuration information for a customer corresponding to said customer premises equipment (CPE) device, said configuration file comprising a publication by said internet service provider (ISP) of information describing a quality of service (QoS) of network resources provided by said Internet service provider (ISP) to said customer premises equipment;

configure said customer premises equipment (CPE) device in accordance with said configuration file; and route traffic in accordance with said configuring.

21. The customer premises equipment (CPE) device of claim 20, wherein said instructions contained in said non-transitory persistent storage medium, when loaded into said memory, further configure said at least one processor to:

dispatch a request to said internet services provider (ISP); and responsive to said request, obtain, from said internet services provider (ISP), a pointer to said configuration file;

wherein said obtaining of said configuration file comprises following said pointer.

22. The customer premises equipment (CPE) device of claim 21, wherein:

said request comprises a dynamic host protocol configuration (DHCP) request and said customer premises equipment (CPE) device comprises a router;

said pointer comprises a uniform resource locator (URL) pointing to said configuration file.

23. The customer premises equipment (CPE) device of claim 20, wherein said at least one processor routes said traffic by placing indicators in packets of said traffic in accordance with said configuration file.

24. A system comprising:

a dynamic host control protocol (DHCP) server of an internet services provider (ISP);

a router of said internet services provider (ISP);

a back-end provisioning database of said internet services provider (ISP);

a quality of service (QoS) configuration file generator coupled to said back-end provisioning database; and a web server of said internet services provider (ISP), coupled to said quality of service (QoS) configuration file generator;

wherein:

said dynamic host control protocol (DHCP) server receives a dynamic host control protocol (DHCP) request from customer premises equipment of a customer of said internet services provider (ISP);

said dynamic host control protocol (DHCP) server responds to said request with a pointer to a configuration file containing circuit configuration information for said customer;

said quality of service (QoS) configuration file generator coupled to said back-end provisioning database generates said configuration file;

responsive to said customer premises equipment of said customer following said pointer, said web server serves said configuration file via a dynamic host protocol configuration (DHCP) response to said customer premises equipment of said customer, said configuration file comprising a publication by said internet service provider (ISP) of information describing a quality of service (QoS) of network resources provided by said Internet service provider (ISP) to said customer premises equipment; and said router of said internet services provider (ISP) switches subsequent data packets from said customer in accordance with indicators placed in said packets by said customer premises equipment of said customer in accordance with said configuration file.

25. The system of claim 24, wherein said pointer comprises a uniform resource locator (URL) pointing to said configuration file.

* * * * *